United States Patent [19]

Sutera et al.

[11] Patent Number: 4,725,851

[45] Date of Patent: Feb. 16, 1988

[54] METHOD AND ASSEMBLY FOR MOUNTING FLUID-JET ORIFICE PLATE

[75] Inventors: Richard Sutera, Centerville, Ohio; Louis A. Graham, Greensboro, N.C.; James D. Rouch, Bellbrook, Ohio

[73] Assignee: Burlington Industries, Inc., Greensboro, N.C.

[21] Appl. No.: 879,049

[22] Filed: Jun. 26, 1986

Related U.S. Application Data

[63] Continuation-in-part of Ser. No. 750,589, Jul. 1, 1985, abandoned.

[51] Int. Cl.[4] ........................ G01D 15/18; B23P 15/00

[52] U.S. Cl. ................................. 346/75; 346/140 R; 29/157 C; 29/446; 29/447; 29/454

[58] Field of Search ............................ 346/75, 140 R; 29/157 C, 446, 447, 454

[56] References Cited

U.S. PATENT DOCUMENTS 4,033,021 7/1977 Tybus et al. ...................... 29/157 C

*Primary Examiner*—E. A. Goldberg
*Assistant Examiner*—Gerald E. Preston

[57] ABSTRACT

An orifice plate mounting assembly includes a manifold having an interior cavity defining an elongated slot and fluid communication therewith and a pair of exterior vertical guide surfaces bracketing a recessed substantially planar surface surrounding the elongated slot. A pair of clamping members each having a clamp body, a clamping arm extending horizontally outwardly from the clamp body and defining substantially planar contact surfaces, and hinge elements are provided to horizontally position the planar contact surface of each clamping arm in planar contact with the respective portion of the planar orifice plate laterally of the linear array of orifices. Suitable securing elements bridge the manifold assembly in each clamp body to cause each planar contact surface to exert a clamping force against the orifice plate so as to, in turn, exert a clamping force between the planar orifice plate and the recessed planar surface. In one embodiment, the orifice plate is mounted by thermally expanding the length thereof to a predetermined amount and then allowing the orifice plate to thermally contract while maintaining its expanded length so that the orifice plate is maintained in tension between its opposing ends. In an alternative embodiment, a tensioning apparatus is used to place the orifice plate under tension prior to its being clamped into position.

33 Claims, 14 Drawing Figures

FIG. 9
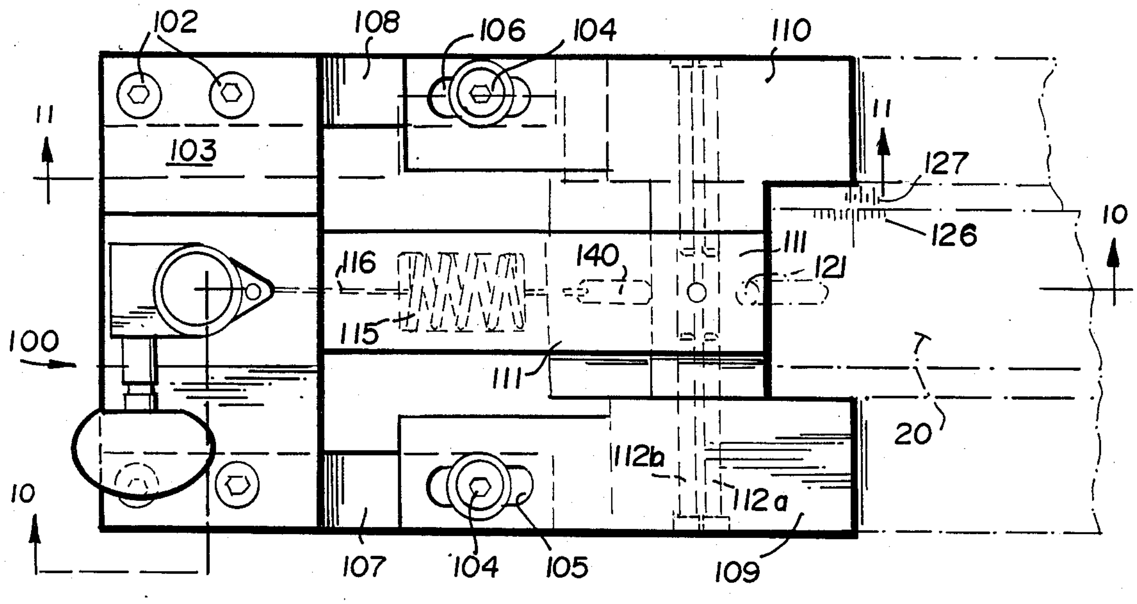
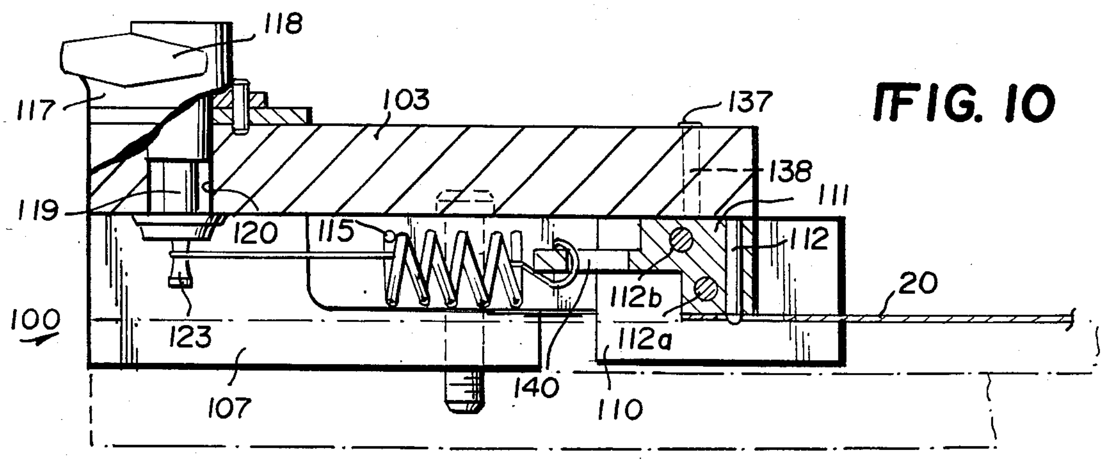
FIG. 10
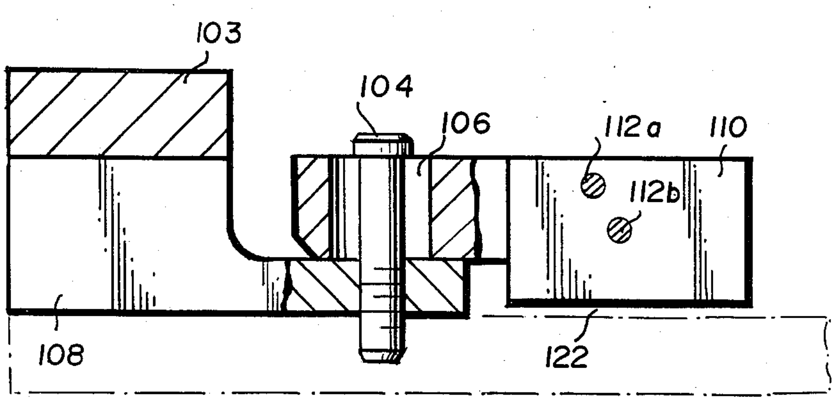
FIG. 11

METHOD AND ASSEMBLY FOR MOUNTING FLUID-JET ORIFICE PLATE

RELATED APPLICATIONS

This application is a continuation-in-part of application Ser. No. 750,589, filed July 1, 1985 now abandoned.

FIELD OF THE INVENTION

The present invention relates to the field of non-contact fluid marking devices which are commonly known as "ink-jet" or "fluid-jet" devices. More particularly, the present invention relates to the method and assembly to mount an orifice plate to a fluid-jet device and to the apparatus used in the mounting operation.

BACKGROUND AND SUMMARY OF PRESENT INVENTION

Ink-jet devices in and of themselves are well known through e.g. U.S. Pat. Nos. 3,373,437 to Sweet et al; 3,560,988 to Krick; 3,579,721 to Kaltenbach; and 3,596,275 to Sweet. Typically, prior art ink-jet devices provide a linear array of fluid-jet orifices formed in an orifice plate from which filaments of pressurized marking fluid (e.g. ink, dye, etc.) are caused to issue from a fluid supply chamber. An individually controllable electrostatic charging electrode is disposed downstream of the orifice plate along the so-called "drop-formation" zone. In accordance with known principles of electrostatic induction, the fluid filament is caused to assume an electrical potential opposite in polarity and related in magnitude to the electrical potential of its respective charging electrode. When a droplet of fluid is separated from the filament, this induced electrostatic charge is then trapped on and in the droplet. Thus, subsequent passage of the charged droplet through an electrostatic field will cause the droplet to be deflected towards a catching structure. Uncharged droplets on the other hand proceed along the normal droplet flight path and are eventually deposited upon a recording substrate.

It has previously been known to use solder techniques to rigidly fix an orifice plate to an orifice plate holder. However, such previous solder techniques are disadvantageous in that bowing of the orifice plate occurs due to differential thermal expansion and temperature variances between the orifice plate and the orifice plate holder. This phenomenon is, at least in part, thought to be caused by the fact that the solder technique precludes intimate planar contact between the various structural components.

Recently it has been proposed to utilize ink-jet devices as a means to print patterns or the like on textile materials, attention being directed to commonly owned U.S. Ser. No. 428,490 to Gamblin filed Sept. 28, 1982, which is expressly incorporated herein by reference. In order to achieve fine printing of patterns on a textile substrate, it is necessary to utilize an orifice plate having a linear array of very small orifices sized in the range of, for example, 0.00035 to 0.020 inch diameters. A problem exists with the use of such small-sized orifices in that mechanical bending or "bowing" in the longitudinal axis of the orifice plate detrimentally affects the print quality. That is, mechanical bending of the orifice plate results in the imprecise formation or sequencing of fluid droplet streams issuing from the orifices thereby deleteriously affecting the subsequent controlled charging and/or deflection thereof from a predetermined flight path.

By way of the present invention, such disadvantages have been overcome by providing a novel mounting assembly which minimally stresses the orifice plate laterally of the linear array of orifices so as to prevent its axial bowing. In one method according to the present invention, the orifice plate is thermally expanded and then allowed to cool while maintaining the expanded length so as to tension the orifice plate between its opposing ends. In an alternative method according to the invention, a stretching (tensioning) apparatus places the orifice plate under tension prior to its being clamped into position on the fluid jet manifold assembly. In this second method, the mechanical tensioning is done in lieu of tensioning by thermally expanding and cooling the orifice plate. Both methods contribute to maintaining the planar nature of the orifice plate and thus significantly reduce any potential orifice plate deformation.

INFORMATION DISCLOSURE STATEMENT

The reader's attention is directed to the following publications so that further insight into the novel features of the present invention can be obtained:

U.S. Pat. No. 3,925,791—Hunt (Dec. 9, 1975)
U.S. Pat. No. 4,343,013—Bader et al (Aug. 3, 1982)
U.S. Pat. No. 4,005,435—Lundquist et al (Jan. 25, 1977)
U.S. Pat. No. 4,153,901—White et al (May 8, 1979)
U.S. Pat. No. 4,282,532—Markham (Aug. 4, 1981)
U.S. Pat. No. 4,146,899—Paranjpe et al (Mar. 27, 1979)
U.S. Pat. No. 4,305,079—Mix, Jr. (Dec 8, 1981)
U.S. Pat. No. 4,307,407—Donahue et al (Dec. 22, 1982)
U.S. Pat. No. 4,356,499—Kodama (Oct. 26, 1982)
U.S. Pat. No. 4,390,883—Stoneburner (June 28, 1983)
U.S. Pat. No. 4,429,317—Umezawa et al (Jan. 31, 1984)

Hunt '791 relates to the means which permit the positioning and alignment of a jet of printing liquid which issues from a hole in a disc. To accomplish such functions, Hunt '791 provides a compressible washer retained in recess. The disc bears against the compressible washer and is held in position by a plate which defines a central hole. A trio of aligned holes in the plate and bottom flange of the housing couple the plate to the bottom flange so as to capture the disc between the plate and the washer in the central recess. Thus, upon selective adjustment of the nut and bolt assemblies respectively provided in each aligned hole, varying forces appear to be exerted upon the disc so as to permit the control of the direction of fluid issuing through the hole in the disc.

Bader et al '013 disclose a leaf spring secured to a print head in overlying fashion with respect to nozzle plate. Bader et al '103 require that the orifice plate be fixed to the print head by means of screws in addition to the securing functions provided by the leaf spring.

Lundquist et al '435 merely disclose that a holder can be threadably coupled to the forward end of a block so to provide an easily removable mounting from the nozzle (see FIG. 2).

White et al '901 disclose a sandwich-type structure for mounting an orifice plate to a base. The screws are required by White et al's '901 structure to pass through each element of the sandwich-type structure including the orifice plate 16.

Paranjpe et al '899 relate to a formed orifice plate which defines a trough having outwardly extended flanges. Thus, the trough-like orifice plate of Paranjpe et al '899 is dependently supported in the orifice plate holder.

Attention is also directed to U.S. Pat. Nos. 4,081,804 to Van Breeman et al; 4,080,607 to Van Breeman et al; 4,080,608 to Stoneburner et al; 4,123,760 to Hou; 4,234,884 to Vetter; 4,257,052 to Stoneburner; and 4,258,370 to Paranjpe which generally disclose the known prior method of securing an orifice plate to an orifice plate holder by means of solder, particularly attention being directed, for example, to FIG. 13 of Van Breeman et al '804 and the disclosure appearing on column 7, lines 12–15.

SUMMARY OF THE PRESENT INVENTION

The present invention provides for a method and an assembly whereby axial bowing of the orifice plate is prevented by maintaining the planar orifice plate against a planar surface defined on an orifice plate holder. A pair of clamp members accomplish this function, each of which includes a clamp body defining a vertical guide surface which slidably cooperates with a vertical guide surface formed on the exterior of a manifold assembly. Each clamp member also includes a horizontally outwardly extended arm which defines at its terminal end a substantially planar contact surface. Suitable securing elements such as machine bolts or the like extend through the clamp body so as to bridge the clamp body and manifold assembly. Thus, each securing element causes the planar contact surface at the terminal end of each clamp arm to exert a clamping force against the planar orifice plate and, in turn, to also exert a clamping force between the planar orifice plate and the recessed planar surface of the manifold assembly. This advantageous planar contact exerted upon the orifice plate in a narrow region laterally of the linear array of orifices by means of the planar contact surface of each clamp arm advantageously prevents bowing of the orifice plate as forces will be evenly distributed along the axial length thereof.

In an alternative embodiment of the mounting assembly in accordance with the present invention, each of the clamp members is provided with hinge means consisting of one or more hinge elements which connect the clamp members to the manifold assembly for engagement and disengagement with the planar surface of the orifice plate. It has been found that the use of such hinge means provides a number of distinct advantages over the earlier-developed clamping structure. First, the hinges avoid the problem of inaccurate positioning of the clamp members and possible misalignment of the orifice plate on the orifice plate mounting surface. The problem of misalignment is particularly acute for longer orifice plates such as those disclosed in commonly-owned application Ser. No. 428,490. For increased lengths, it is difficult to secure the orifice plate in the same precise operating position after it has been changed or removed for cleaning or maintenance. Thus, the hinge means ensure that the plate will be secured in the exact same position for successive printing operations.

Another advantage of the hinge means in accordance with the invention is that it facilitates the precise mounting of the clamping members, thereby further ensuring that the clamping forces applied against the orifice plate will be uniformly distributed and will thus prevent bowing about the orifice plate longitudinal axis. The use of hinges also ensures that the clamping members will establish substantially perpendicular planar contact with the orifice plate, thereby preventing the plate from shifting sideways (and misaligning the linear array of orifices) during a printing operation.

To further enhance the mounting of the present invention and to more accurately prevent axial bowing thereof, the present invention also contemplates mounting the orifice plate so as to maintain the orifice plate under tension between its opposing ends. The invention therefore provides two methods and related apparatus for placing the orifice plate under the desired amount of tension. In the first method, the orifice plate is rigidly fixed (by means of clamps or the like) at one end and is then thermally expanded so as to increase the lengthwise dimension of the orifice plate by a predetermined amount (preferably in an amount not greater than 1/16 inch). Once the orifice plate has achieved its desired thermally-expanded length, the other end of the orifice plate is rigidly fixed into position so that, upon cooling, the orifice plate is tensioned between its opposing ends.

In an alternative method according to the invention, one end of the orifice plate is again rigidly secured by means of clamping members. However, the other end of the orifice plate is coupled to a stretching (tensioning) apparatus comprising (1) a fixed member which is rigidly secured to the fluid jet manifold assembly; (2) a movable member operatively connected to the orifice plate; and (3) means for adjusting the position of the movable member relative to the fixed member in the direction of the longitudinal axis of the orifice plate. The tensioning device may be manually adjusted to place the orifice plate under a predetermined amount of tension. Thereafter, the tensioned and extended plate may be rigidly fixed into position on the manifold assembly.

Further aspects and advantages of the present invention will become more clear to the reader after careful consideration is given to the detailed description of the preferred exemplary embodiments thereof which follow:

BRIEF DESCRIPTION OF THE ACCOMPANYING DRAWINGS

Reference will be hereinafter made to the accompanying drawings wherein like reference numerals throughout the various FIGURES denote like structural elements and wherein:

FIG. 9 is a top plan view of one embodiment of the orifice plate tensioning apparatus depicted in FIG. 8;

FIG. 10 is a section view taken along line 10—10 of FIG. 9;

FIG. 11 is a section view taken along line 11—11 of FIG. 9;

DETAILED DESCRIPTION OF THE PREFERRED EXEMPLARY EMBODIMENTS

Figure 1:
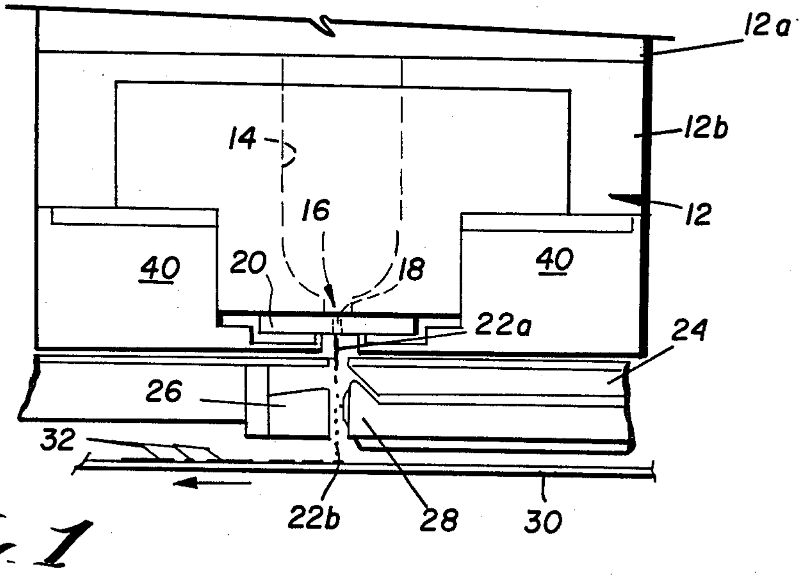
FIG. 1 is a schematic elevational view of fluid-jet printing apparatus in which the assembly of the present invention is utilized.

A fluid-jet apparatus 10 in which the present invention finds particular utility is shown in accompanying FIG. 1. The fluid-jet apparatus 10 generally includes a manifold assembly 12 which defines a fluid supply chamber 14. The lower end of supply chamber 14 establishes an outlet slot 16 so that fluid can pass through a linear array of orifices 18 defined in orifice plate 20. Fluid filament 22*a* issuing from each orifice 18 breaks into individual droplets 22*b*. Prior to droplet formation, an electrostatic charge is placed upon selected ones of droplets 22*b* by means of charging electrode 24. Changed ones of droplets 22*b* are then deflected by deflection electrode 26 towards catching structure 28 while uncharged ones of droplets 22*b* proceed on to substrate 30 so as to be deposited thereon and form indicia, patterns or the like generally represented by numeral 32.

Figure 2:
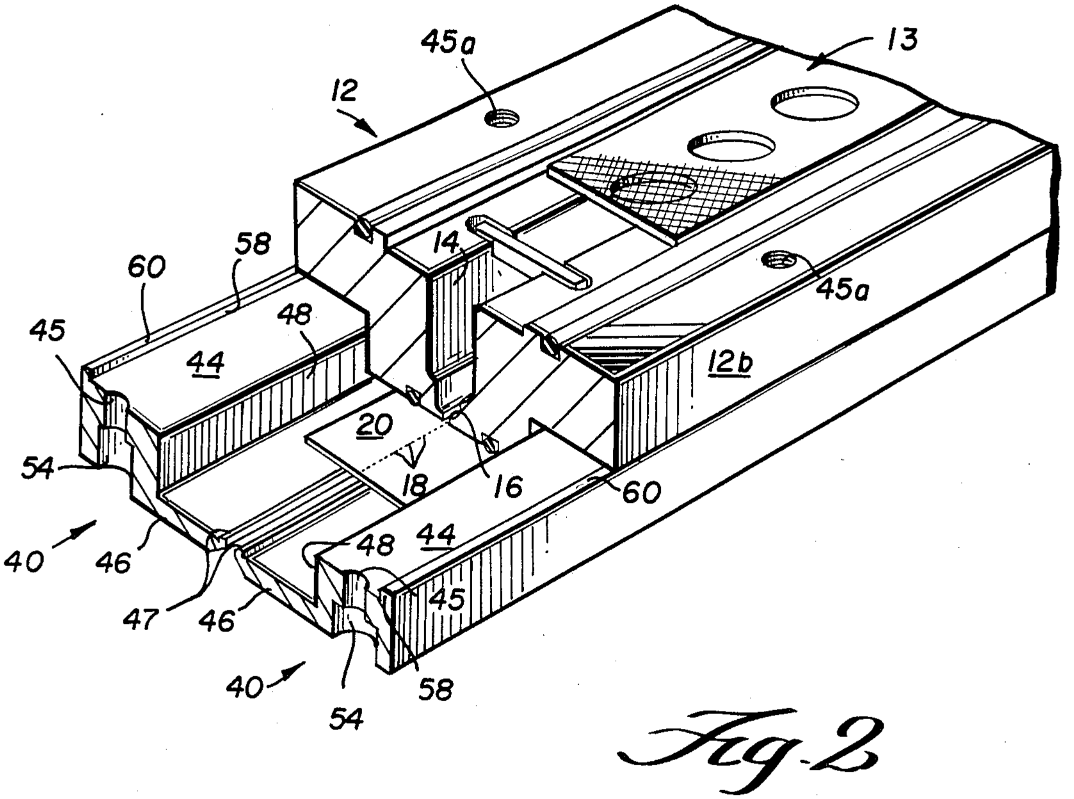
FIG. 2 is a perspective sectional view of an exemplary mounting assembly in accordance with the present invention.
Figure 3:
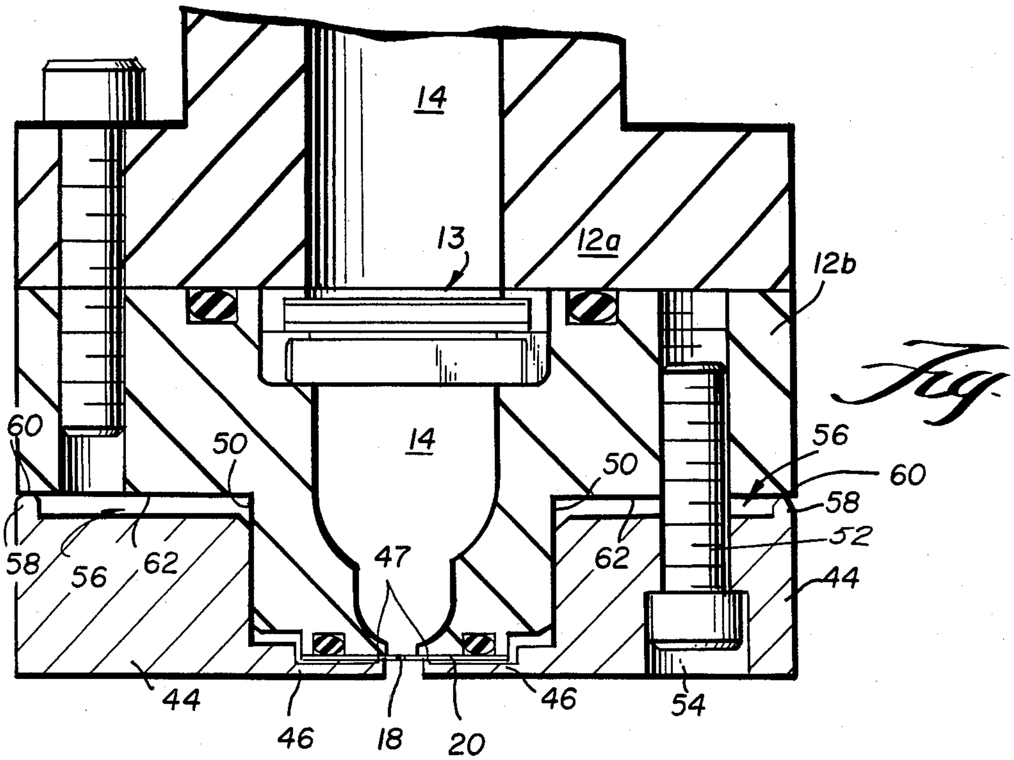
FIG. 3 is a cross-sectional elevational view of an exemplary mounting assembly of the present invention.

Orifice plate 20 is shown in a greatly enlarged manner in FIG. 1 for clarity of presentation. As can be seen, orifice plate 20 is mounted to manifold assembly 12 by means of a pair of laterally opposing clamp members 40. Accompanying FIGS. 2 and 3 more clearly show the clamp members 40 of the present invention.

The clamping assembly of the present invention includes a pair of clamp members 40 in opposing relationship to one another. Each clamp member 40 includes a clamp body 44 and a substantially horizontally extending clamp arm 46, the clamp arm 46 thereby defining a bearing surface 47 to bear against the orifice plate 20 when clamp body 44 is clamped to manifold assembly 12 and to maintain a slight clearance between arm 46 and plate 20. Each clamp body 44 also defines a substantially vertical bearing surface 48 which cooperates with a respective one of the vertical bearing surfaces 50 of manifold assembly 12.

Manifold assembly 12 is preferably a split-bodied design having upper and lower manifold members 12*a*, 12*b*, respectively. Preferably, the fluid supply chamber 14 is fitted with a turbulence damping structure 13 as more fully disclosed in U.S. application Ser. No. 720,735 to Sutera et al filed Apr. 8, 1985, entitled "BAFFLE TO MINIMIZE TURBULENCE WITHIN ORIFICE PLATE". Each clamp body 44 includes an aperture 45 so that a bolt 52 or like threaded securing means can be placed in recessed surface 54 in registry with a threaded aperture 45*a* of manifold assembly 12 so as to bridge the space 56 defined between the clamp body 44 and the manifold assembly 12 (see FIG. 3). The upper end of each clamp body 44 includes a vertically extending flange portion 58 establishing a seating surface 60 which bears against the horizontal opposing surface 62 of the clamp body 44.

As can be appreciated, bearing contact is established between the manifold assembly 12 and the bearing surface 60 of the flange 58 on the one hand and the manifold assembly 12 and the planar surface 47 of the clamp arm 44 through the orifice plate 20 on the other hand so that an advantageous force distribution therebetween occurs. That is, upon tightening of the bolts 52, the linear contact areas established by the planar bearing surface 47 of the clamp arm 46 and the bearing surface 60 of the flange 58 will uniformly distribute the forces applied against the orifice plate 20 so as to substantially prevent bowing thereof about the elongated axis of plate 20.

Figure 4:
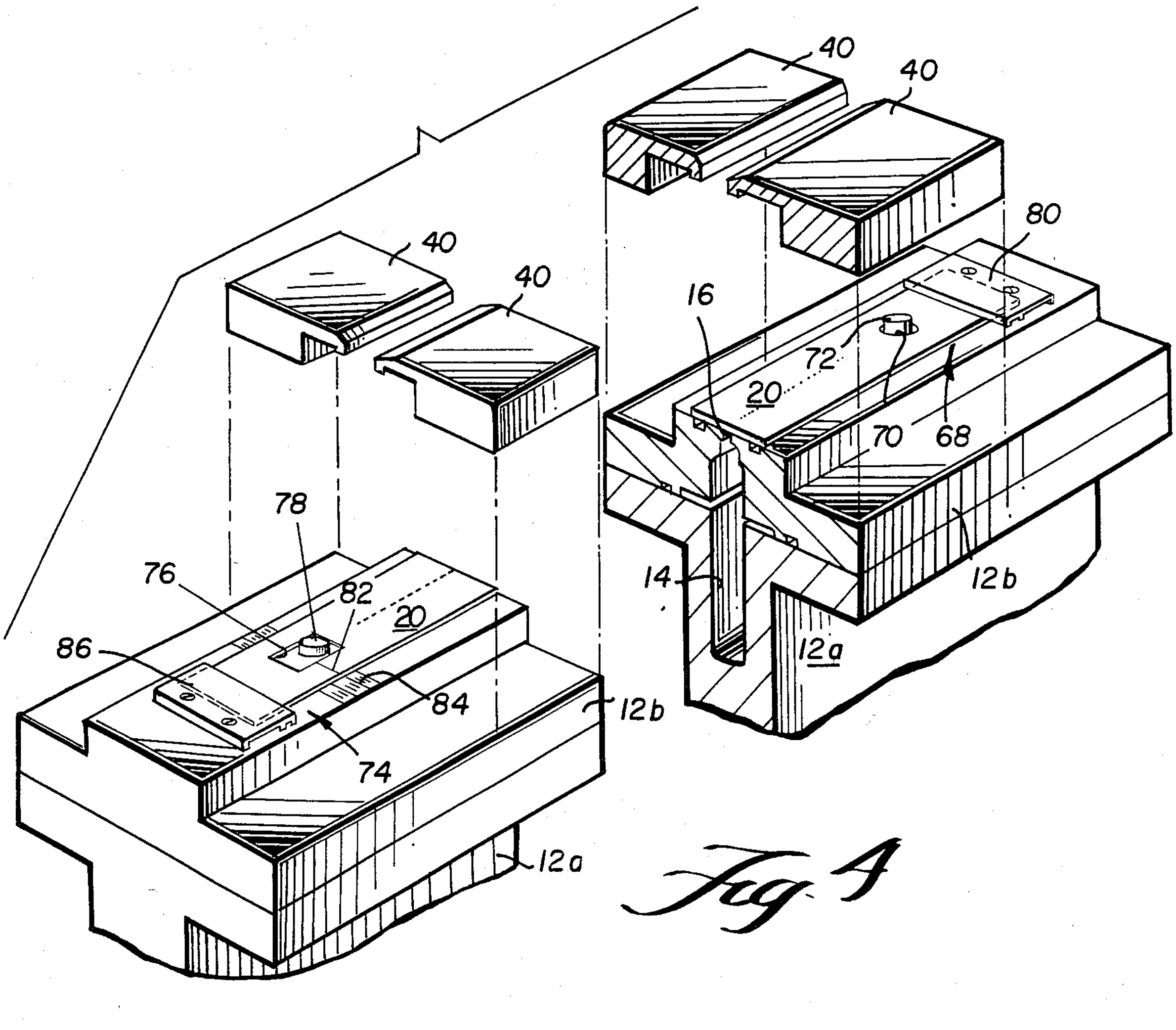
FIG. 4 is a perspective, partially sectioned inverted view of the mounting assembly of the present invention.

In order to mount the orifice plate to the manifold assembly, it is preferred that one end 68 of orifice plate 20 be provided with an aperture 70 which registers with a fixed-position peg 72 formed on the manifold assembly 12, particular attention being directed to accompanying FIG. 4 for the discussion which follows. The other end 74 of the orifice plate 20 is preferably provided with an opening 76 which is enlarged in the axial direction of orifice plate 20 and which accepts a second fixed-position peg 78 therein. Once the orifice plate 20 is positioned relative to the outlet slot 16 of the fluid supply chamber 14, one end 68 of the orifice plate is rigidly fixed to the manifold assembly by any suitable securing devices, such as a screw and clamp assembly 80 as shown in FIG. 4.

Heat is then applied directly to the orifice plate 20 so as to effect thermal expansion thereof. Any suitable means to heat and thus thermally expand the orifice plate can be utilized such as electrical resistance heating, heated air, etc. Most preferred however is the use of heated air (e.g., 180° F.) directly impinging upon the orifice plate 20. The thermal expansion of the orifice plate 20 is visually perceived by noting displacement of the indicator line 82 (etched onto the exterior visible surface of the orifice plate 20) relative to the scale 84 (etched onto the visible surface of the manifold assembly 12). Preferably, the scale 84 is subdivided into a plurality of lines having 1/32 inch centers.

Before heating the orifice plate assembly, its initial or "cold" length is visually determined by comparing the relative positions of the indicator line 82 and the scale 84. Thereafter, the orifice plate is caused to thermally expand a predetermined amount as described above. It has been found that expansion of the orifice plate 20 to 1/16 inch greater than its initial or "cold" length as determined of the relative movement by the indicator line 82 and the scale 84 advantageously causes the proper tensioning to be applied between the opposing ends of the orifice plate 20. Once the requisite degree of orifice plate thermal expansion has occurred, the other end 74 of the orifice plate 20 is rigidly fixed in position relative to the manifold assembly 12 by means of a screw and clamp assembly 86 thereby maintaining the orifice plate in its thermally-expanded length. The orifice plate 20 is then allowed to cool to ambient temperature while being maintained in its expanded length so that upon cooling and thus thermal contraction thereof, tension is applied between its opposing ends 68, 74. Orifice plate 20 is maintained under a desirable tension so as to aid in its planar mounting to manifold assembly 12. Subsequently, the pair of clamp members 40 as described previously are then positioned so as to complete the mounting of orifice plate 20 onto manifold assembly 12.

Figure 5:
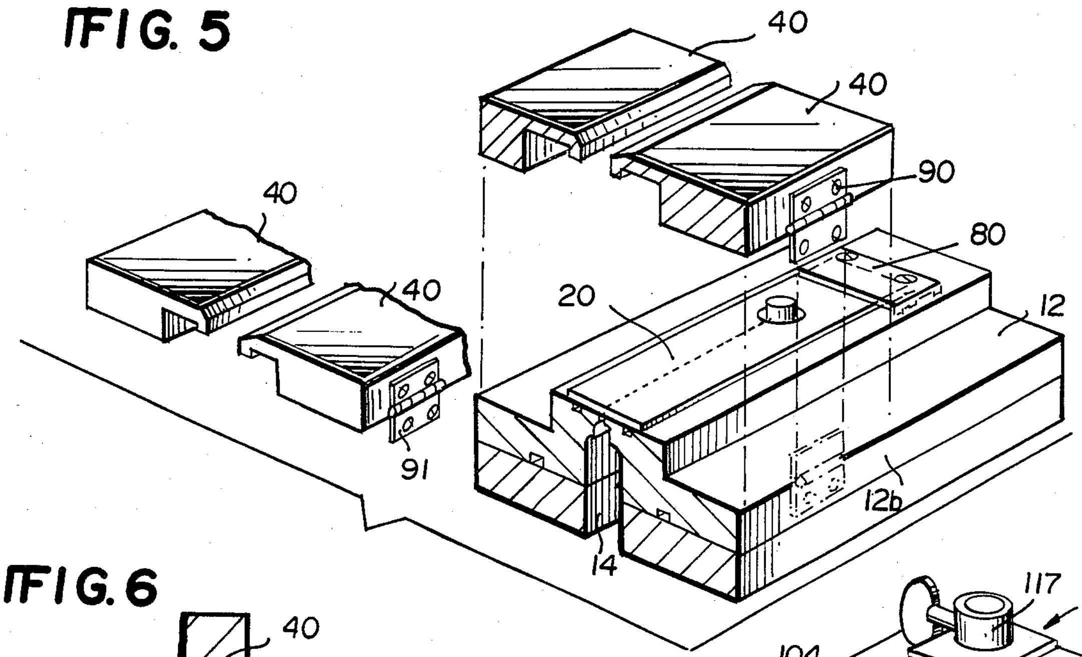
FIG. 5 is a perspective partially sectioned view of an alternative embodiment of the mounting assembly in accordance with the invention.
Figure 6:
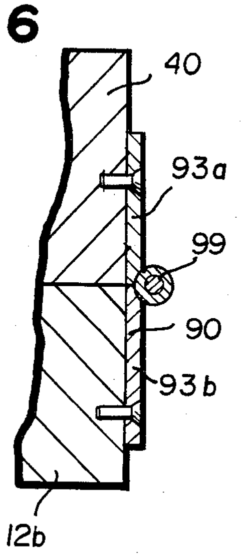
FIG. 6 is a cross-sectional elevation view of exemplary hinge means used in the mounting assembly depicted in FIG. 5.
Figure 7:
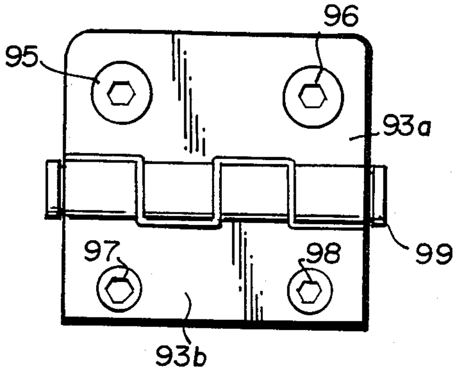
FIG. 7 is an elevation view of the hinge means depicted in FIGS. 5 and 6.

An alternative embodiment of the clamping assembly and clamp members in accordance with the present invention is depicted in FIGS. 5, 6 and 7 of the drawings. With particular reference to FIG. 5, orifice plate 20 is shown mounted to the manifold assembly in the same manner described above in which one end of orifice plate 20 is provided with an aperture which registers with a fixed-position peg formed on manifold assembly 12. Enlarged opening 76 in the other end of the orifice plate 20 accepts a second fixed position peg 78. Once orifice plate 20 is positioned relative to the fluid supply chamber 14, one end of the orifice plate is rigidly fixed to the manifold assembly by way of suitable securing means such as screw and clamp assembly 80. After the orifice plate has been thermally expanded or tensioned as described herein, the other end of the plate may be rigidly fixed in position relative to manifold assembly 12 thereby maintaining it in its extended and tensioned form.

Subsequently, the pair of clamp members 40 as previously described are positioned so as to complete the mounting of the orifice plate 20 onto manifold assembly 12. As indicated above, it is desirable that the clamp members be positioned such that the substantially planar bearing surfaces (shown as 46 and 47 on FIG. 2) of the clamping members will impact on the planar surface of the orifice plate in precisely the same position and witht the same orientation during each successive installation of the orifice plate. It has been found that such precise positioning may be ensured by providing one or more hinge means operatively connecting clamp members 40 to the lower portion of manifold assembly 12.

As FIG. 5 indicates, one or more hinge elements 90 and 91 are rigidly secured to clamp members 40 and to lower manifold member **12*b* by way of threaded securing means (shown by way of example as 95, 96, 97 and 98 in FIG. 7). The hinged clamp members 40 may thus be swung into position and secured to the manifold assembly to thereby contact the planar surface of the orifice plate in the same manner and in the same location by making bearing contact between the manifold assembly and the bearing surface of flange 58 on the one hand and the manifold assembly 12 and planr surface 47 of clamp arm 44 through orifice plate 20 on the other hand (see FIG. 2). A plurality of hinge elements may be independently spaced along clamp members 40 to further ensure that an advantageous force distribution occurs between the manifold assembly and orifice plate 20. After hinged clamps 40 are in position, bolts 52 may be tightened. Again, the linear contact areas established by the planar bearing surface 47 of clamp arm 46 and bearing surface 60** will uniformly distribute the forces applied against the orifice plate so as to substantially prevent bowing thereof.

The details of the hinge means shown in FIG. 5 are depicted in FIGS. 6 and 7 of the drawings. Each hinge consists of mounting plates **93*a* and 93*b*, respectively, which are fixedly secured to clamp members 40 and lower mounting assembly 12*b* by way of fastening screws 95, 96, 97 and 98. Each mounting plate is attached to hinge pin 99 for rotation about its longitudinal axis. FIG. 6 shows hinge means 90 fixedly secured to clamping member 40 and lower manifold member 12*b***.

Figure 8:
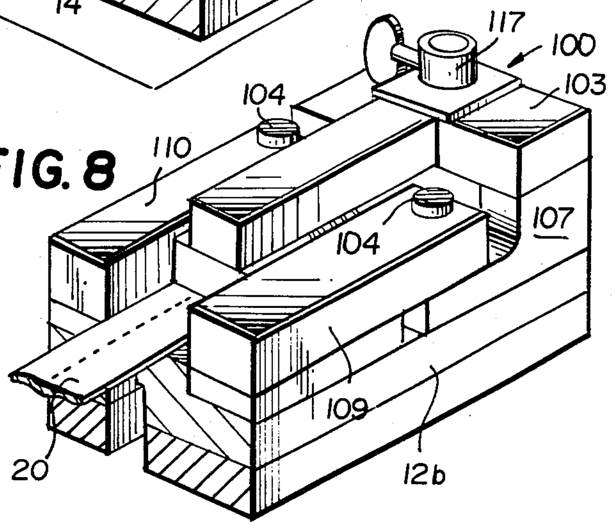
FIG. 8 is a perspective partially sectioned view of a mounting assembly showing an exemplary orifice plate tensioning apparatus in accordance with the invention.

An alternative mounting assembly and apparatus for placing an orifice plate under tension during the mounting operation is depicted in FIGS. 8, 9, 10 and 11 of the drawings. FIG. 8 generally depicts the mechanical tensioning apparatus in accordance with the invention disposed on the substantially planar orifice mounting surface at one end of orifice plate 20. An exemplary tensioning apparatus is shown generally at 100 and comprises three basic components—a fixed member rigidly secured to one end of the orifice plate mounting surface; a movable member operatively connected to the fixed member and coupled to one end of the orifice plate; means for securing one end of the orifice plate to the orifice plate mounting surface; and means for adjusting the movable member to cause a reciprocal translational movement of the orifice plate and thereby tension the orifice plate prior to its being clamped into position.

As FIG. 9 illustrates, the fixed member consists of a top mounting plate 103 which is rigidly secured to a first pair of L-shaped lower side members 107 and 108. Plate 103 and side members 107 and 108 are rigidly fixed to lower manifold member **12*b* by way of machine bolts 104 and are disposed at one end of orifice plate 20 with side members 107 and 108 being laterally spaced on opposite sides of the orifice plate. Top plate 103 is also fixedly secured to side members 107 and 108 by mounting bolts 102**.

The movable member in tensioning apparatus 100 consists of side members 109 and 110, each of which slidably cooperates with the orifice plate mounting surface along laterally opposed sides of lower manifold member **12*b*. Side members 109 and 110 are fixedly secured to a central member 111 by mounting bolts 112*a* and 112*b* to thereby form a single movable, integral structure disposed across one end of orifice plate 20. Central member 111 is positioned directly on top of orifice plate 20 and contains coupling means at one end thereof as exemplified by post member or dowel pin 112. The coupling of the movable member to the orifice plate is accomplished by inserting dowel pin 112 in orifice plate 20**.

The bottom surface of central member 111 and the orifice plate mounting surface also define a space below central member 111 sufficient to insert one end of orifice plate 20. At its other end, central member 111 is operatively connected to a spring 115 which in turn connects by way of cable means 116 to tension actuator means 117. Actuator means 117 consists primarily of a cross-axis gear assembly whereby the rotational movement of horizontal tensioning knob 118 is transmitted to a rotatable vertical shaft 119 which is disposed substantially perpendicular to tensioning knob 118. Vertical shaft 119 is rotatably mounted in bore 120 of top plate 103 in a close fitting manner but is freely rotatable in either direction. The top portion of rotatable shaft 119 contains a worm gear which operatively engages a like gear at one end of tensioning knob 118. The bottom free end of vertical shaft member 119 is attached to cable means 116 which in turn connects to one end of spring 115.

In order to mount an orifice plate under tension using the tensioning apparatus in accordance with the present invention, one end of orifice plate 20 is rigidly fixed to the orifice plate mounting surface by any suitable securing device such as the screw and clamp assembly shown at 80 on FIG. 5. An aperture in the free end of orifice plate 20 is aligned with opening 121 in central member 111. The orifice plate is then coupled to the movable member by inserting dowel pin 112 through opening 121.

Figure 12:
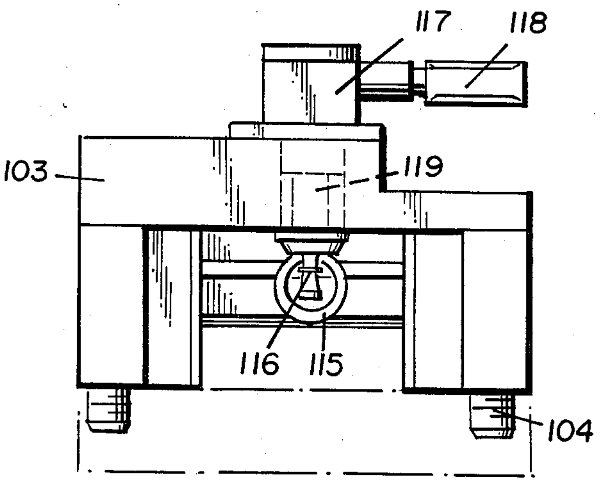
FIG. 12 is a rear elevation view of the apparatus depicted in FIG. 9.

Tensioning apparatus 100 may be permanently attached to the orifice plate mounting assembly or, alternatively, removed for each orifice plate change, depending on the amount of room available for the fluid jet mounting assembly. Preferably, the apparatus is mounted and secured on a permanent basis by mounting bolts 104 as shown in greater detail in FIG. 12. In either case, one end of orifice plate 20 may be coupled to central member 111 without removing apparatus 100 because of the clearance between the central member and the mounting assembly as shown at 122 on FIG. 11.

Once both ends of orifice plate 20 have been secured in position, the tensioning is accomplished by rotating horizontal tensioning knob 118 which engages the worm gear on vertical rotating shaft member 119 which in turn causes cable means 116 to wrap around the free end 123 of shaft 119. The rotation of free end 123 causes spring 115 to be extended, thereby causing translational movement and a resultant tensioning of orifice plate 20. The amount of tensioning may be visually perceived by noting the displacement of indicator line 126 which is etched onto the exterior visible surface of orifice plate 20 relative to scale 127 which is etched onto the visible surface of manifold assembly 12. Preferably, scale 127 is subdivided into a plurality of lines having 1/32-inch centers. After the tensioning is completed, clamp members 40 may be swung into position and secured to the orifice plate mounting assembly as described above.

FIG. 10 is a section view taken along lines 10—10 of FIG. 9 and shows the movable member and tensioning means in accordance with the invention as well as the connection between the tensioning means and orifice plate 20. As FIG. 10 illustrates, the movable member consists of side portions 109 and 110 which are fixedly secured to central member 111 by way of horizontally disposed anchoring bolts **112*a* and 112*b*. The combined integral structure slidably cooperates with the top surface of the orifice plate mounting assembly, i.e., along the planar surface of lower manifold assembly 12*b*. Orifice plate 20 is coupled to the movable member by inserting dowel pin 112 through the opening 121 in central member 111**.

FIG. 10 also shows means for applying a pressure force on the top surface of central member 111 by way of a set screw 137 disposed in opening 138 of fixed member 103. Immediately prior to the tensioning step, the set screw is adjusted to make contact with the top surface of central member 111. Set screw 137 thereby prevents the central member 111 from bowing upwardly as a result of the force applied in a lateral direction during tensioning. Central member 111 is coupled to spring 115 at one end thereof by insertion in elliptical opening 140 in central member 111. The other end of spring 115 is attached to cable means which in turn operatively connects to the free end of rotatable vertical shaft 119 in actuator 117.

FIG. 11 is a section view taken along line 11—11 of FIG. 9. Machine mounting bolts 104 are disposed in bore openings 105 and 106 and extend through openings in L-shaped side members 107 and 108 and movable side members 109 and 110 for threaded engagement in lower manifold assembly **12*b*. Openings 105 and 106 are enlarged in the axial direction to allow movable members 109 and 110 to move in a lateral direction during the tensioning operation. The rear elevation view depicted in FIG. 12 of the drawings shows cable means 116 attached to the free end of rotatable vertical shaft 119. In this particular embodiment, top mounting plate 103 is recessed as shown to provide clearance for horizontal tensioning knob 118**.

Figure 13:
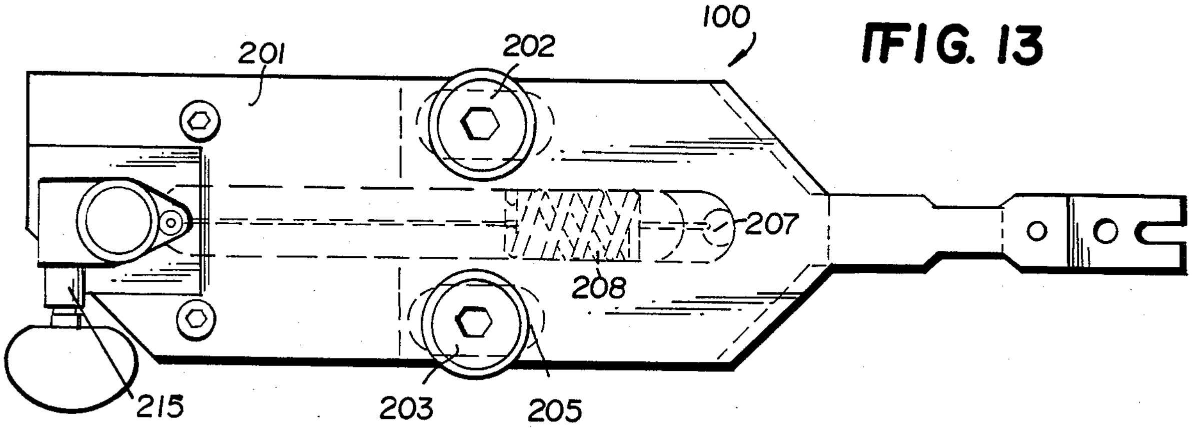
FIG. 13 is a top plan view of an alternative embodiment of the orifice plate tensioning apparatus depicted in FIG. 8.
Figure 14:
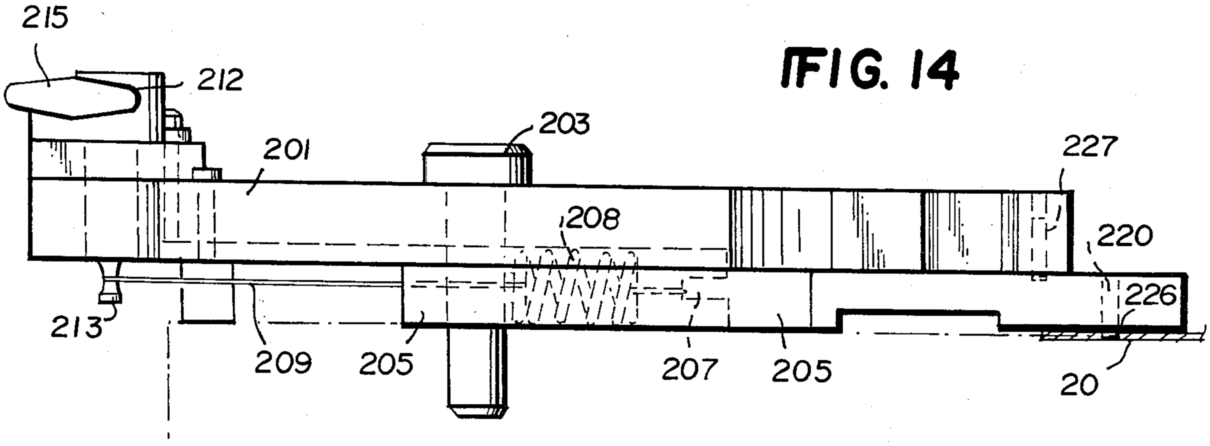
FIG. 14 is an elevation view of the tensioning apparatus shown in FIG. 13.

An alternative embodiment of the tensioning apparatus in accordance with the present invention is depicted in FIGS. 13 and 14 of the drawings. In this second embodiment, the fixed member consists of mounting plate 201 which is rigidly secured in position relative to the orifice plate mounting surface by way of mounting bolts 202 and 203, respectively. The mounting bolts pass through bore openings in movable plate 205 and into lower mounting assembly **12*b* to fixedly secure top mounting plate 201. Movable plate 205 slidably cooperates with the orifice plate mounting surface to provide reciprocal translational movement of orifice plate 20 during tensioning. The central portion of movable member 205 is disposed on top of orifice plate 20 and contains eyelet coupling means 207 at one end thereof. Thus, one end of movable member 205 operatively connects to spring 208 which in turn connects by way of cable means 209 to tension actuator 212 at its free end 213. Again, the actuator consists of a cross-axis gear assembly whereby the rotational movement of horizontal tensioning knob 215** is transmitted to a rotatably-mounted vertical shaft member oriented at 90° thereof.

In order to mount orifice plate 20 under tension using the apparatus depicted in FIGS. 13 and 14, one end of the orifice plate is rigidly secured to the orifice plate mounting surface by using a screw and clamp assembly such as that shown by item 80 in FIG. 1. The other end of the plate is positioned in alignment with opening 220 in movable member 205. Dowel pin 226 is then inserted in opening 220 to operatively connect orifice plate 20 to movable member 205 and setscrew 227 is adjusted to make contact with the top surface of the movable member. After both ends of the orifice plate have been secured into position, the tensioning is accomplished as described above.

While the present inventibn has been herein described in what is presently conceived to be the most preferred embodiments thereof, those in this art may appreciate that many modifications may be made thereof, which modifications shall be accorded the broadest scope of the appended claims so as to encompass all equivalent methods, assemblies and/or structures.

What is claimed is:

1. A method to mount an orifice plate of the type used in a fluid jet printing apparatus, said method comprising the steps of:

(a) rigidly fixing the position of one end of said orifice plate relative to an outlet of a means defining a fluid supplY chamber;

(b) thermally expanding the orifice plate until the lengthwise dimension of said orifice plate increases by a predetermined amount; and (c) then rigidly fixing the position of the other end of said orifice plate when said orifice plate lengthwise dimension achieves said predetermined amount.

2. A method as in claim 1 wherein subsequent to step (c) there is practiced the step of:

(d) allowing said thermally expanded orifice plate to cool so as to be tensioned between said one and other ends.

3. A method as in claim 1 wherein prior to step (a) there is practiced the step of:

(a1) positioning the orifice plate relative to said outlet.

4. A method as in claim 3 wherein step (a1) is practiced by registering an aperture formed in said orifice plate with a post member associated with said fluid supply chamber defining means.

5. A method as in claim 1 wherein step (b) is practiced by applying heat to said orifice plate for a time sufficient to cause thermal expansion thereof.

6. A method as in claim 5 wherein step (b) is further practiced by visually monitoring the thermal expansion of said orifice plate by observing the relative movement between a visible scale formed on said fluid supply chamber defining means and an indicator formed on said orifice plate.

7. A method as in claim 6 wherein step (c) is practiced when said indicator moves relative to said scale a magnitude indicative of said predetermined amount.

8. A method as in claim 5 wherein step (b) is practiced utilizing heated air.

9. A method as in claim 7 wherein said predetermined amount is about 1/16 inch.

10. A method of mounting an orifice plate under tension to an orifice plate mounting surface of a fluid-jet printing apparatus, said method comprising the position thereof relative to said mounting surface;

(a) clamping one end of said orifice plate to rigidly fix the position thereof relative to said mounting surface;

(b) thermally expanding said orifice plate until the length of said orifice plate achieves a length $L_1$;

(c) clamping and thus rigidly fixing the other end of said thermally expanded orifice plate to maintain said length $L_1$; and (d) allowing said orifice to thermally contract to cause said orifice plate to be tensioned between said one and other ends by virtue of said maintained length $L_1$.

11. A method as in claim 10 further comprising the step of clamping lateral portions of said orifice plate.

12. A method of mounting a fluid jet orifice plate comprising the steps of:

(a) thermally expanding the orifice plate to achieve an expanded length;

(b) thermally contracting the orifice plate while maintaining said expanded length so that said orifice plate is tensioned between its opposing ends.

13. An orifice plate mounting assembly comprising:

a manifold assembly including an interior cavity having an elongated slot in fluid communication therewith and a pair of exterior first vertical guide surfaces bracketing a substantially planar mounting surface surrounding said elongated slot;

a substantially planar orifice plate including a linear array of plural orifices, said orifice plate being positioned onto said planar mounting surface so that said linear array of orifices is in fluid communication with said slot;

clamping means for removably clamping and retaining said planar orifice plate onto said planar mounting surface, said clamping means including a pair of clamping members each having a clamp body defining a second vertical guide surface and a clamping arm extending substantially horizontally outwardly from said clamp body and defining a substantially planar contact surface, each said clamping member being operatively disposed on said manifold assembly such that each said second vertical guide surface is in sliding contact with a respective one of said pair of first vertical guide surfaces to horizontally position said planar contact surface of each said clamping arm in planar contact with a respective portion of said planar orifice plate laterally of said linear array of orifices so that fluid issuing from said linear array of orifices passes between terminal ends of said pair of clamping arms; and securing means operatively bridging said manifold assembly and each said clamp body for causing each said planar contact surface to exert a clamping force against said planar orifice plate, and, in turn, also exerting a clamping force between the planar orifice plate and the planar mounting surface to thereby minimize bowing of said orifice plate along its longitudinal axis.

14. An orifice plate mounting assembly as in claim 13 wherein said contact surface is vertically spaced from said arm so that a slight clearance is defined therebetween.

15. An orifice plate mounting assembly as in claim 14 wherein each said clamp body further includes an upwardly extending flange means defining a bearing surface which bears against said manifold assembly, said flange means thereby defining a space between said clamp body and said manifold assembly whereby said securing means bridges said defined space.

16. An orifice plate as in claim 13 wherein each said clamp body further includes an upwardly extending flange means defining a bearing surface which bears against said manifold assembly, said flange means thereby defining a space between said clamp body and said manifold assembly whereby said securing means bridges said defined space.

17. A method for mounting an orifice plate under tension on a fluid jet printing apparatus of the type having means defining a fluid supply chamber, said method comprising the steps of:

(a) rigidly fixing the position of one end of said orifice plate relative to the outlet of said fluid supply chamber;

(b) coupling the other end of said orifice plate to tensioning means, said tensioning means being rigidly mounted on said fluid supply chamber;

(c) adjusting said tensioning means for applying a tension force to said orifice plate; and (d) rigidly fixing the position of said other end of said orifice plate.

18. A method as in claim 17 wherein prior to step (a) there is practiced the step of ($a_1$) positioning the orifice plate relative to said outlet of said fluid supply chamber.

19. A method as in claim 18 wherein step ($a_1$) is practiced by registering an aperture formed in said orifice plate with a post member associated with said tensioning means.

20. A method as in claim 17 wherein step (c) is further practiced by visually monitoring the tensioning of said orifice plate by observing the relative movement between a visible scale formed on said fluid supply chamber and an indicator formed on said orifice plate.

21. A method of mounting an orifice plate under tension to an orifice plate mounting surface in a fluid-jet printing apparatus, said method comprising (a) rigidly fixing the position of one end of said orifice plate relative to said mounting surface;

(b) tensioning and extending said orifice plate until the length of said orifice plate achieves a length $L_1$; and (c) clamping and thus rigidly fixing the other end of said tensioned and extended orifice plate to maintain said length $L_1$.

22. A method as in claim 21 further comprising the step of clamping lateral portions of said orifice plate.

23. An orifice plate mounting assembly comprising:

a manifold assembly including an interior cavity having an elongated slot in fluid communication therewith and a substantially planar mounting surface surrounding said elongated slot;

a substantially planar orifice plate including a linear array of orifices, said orifice plate being positioned on said planar mounting surface so that said linear array of orifices is in fluid communication with said slot;

clamping means for removably clamping and retaining said planar orifice plate onto said planar mounting surface, said clamping means including a pair of clamping members each having a clamp body and a clamping arm extending substantially horizontally outwardly from said clamp body and defining a substantially planar contact surface, each said clamping member being operatively disposed on said manifold assembly and having hinge means rigidly secured to said clamp body and to said manifold assembly for removably positioning each said clamping arm in planar contact with a respective portion of said planar orifice plate and laterally of said linear array of orifices; and securing means operatively bridging said manifold assembly and each said clamp body for causing each said planar contact surface to exert a clamping force against said planar orifice plate, and, in turn, exerting a clamping force between the planar orifice plate and the planar mounting surface to thereby minimize bowing of said orifice plate along its longitudinal axis.

24. An orifice plate mounting assembly as in claim 23 wherein said planar contact surface of each clamping arm is positioned laterally of said linear array of orifices so that fluid issuing from said linear array of orifices passes between terminal ends of said pair of clamping arms.

25. An orifice plate mounting assembly as in claim 23 wherein each said clamp body further includes an upwardly extending flange means defining a bearing surface which bears against said manifold assembly, said flange means thereby defining a space between said clamp body and said manifold assembly whereby said securing means bridges said defined space.

26. An apparatus for mounting an orifice plate under tension in a fluid jet printer of the type having a manifold assembly including an interior cavity having an elongated slot in fluid communication therewith, said apparatus comprising:

a first mounting means disposed on said manifold at one end of said elongated slot for coupling one end of said orifice plate thereto;

a second mounting means disposed on said manifold at the other end of said elongated slot for coupling the other end of said orifice plate thereto;

at least one of said mounting means being adjustable with respect to said manifold in the direction of the longitudinal axis of said elongated slot for exerting a tensioning force on said orifice plate.

27. An apparatus as in claim 26, wherein said first mounting means is rigidly secured to said manifold assembly and said second mounting means comprises a fixed member rigidly secured to said manifold assembly, a movable member operatively connected to said fixed member and being coupled to said other end of said orifice plate, and means for adjusting the position of said movable member relative to said fixed member to cause translational movement of said orifice plate and thereby tension said orifice plate.

28. An apparatus as in claim 27 wherein said adjusting means comprises (a) actuator means for causing an adjustment of said movable member;

(b) spring means for causing reciprocal translational movement of said orifice plate, said spring means being operatively connected to said actuator means and being coupled at one end to said orifice plate; and (c) cable means connecting said spring means and said actuator means.

29. An apparatus as in claim 28, wherein said actuator means consists of first and second rotatable members each having a shaft portion and a gear portion, said rotatable members being disposed substantially perpendicular to one another and being operatively engaged at their gear portions such that the rotation of said first member causes a rotational movement of said second member, said second member being connected to said cable means.

30. An orifice plate mounting assembly comprising:

a manifold assembly including an interior cavity having an elongated slot and a substantially planar mounting surface surrounding said elongated slot;

a substantially planar orifice plate including a linear array of orifices, said orifice plate being positioned onto said planar mounting surface so that said linear array of orifices is in fluid communication with said slot;

clamping means for removably clamping and retaining said planar orifice plate onto said planar mounting surface, tensioning means for exerting a tension force on said orifice plate, said tensioning means comprising a fixed member rigidly secured to one end of said orifice plate mounting surface, a movable member operatively connected to said fixed member and coupled to one end of said orifice plate, and means for adjusting said movable member relative to said fixed member to cause reciprocal translational movement of said orifice plate and thereby tension said orifice plate; and securing means operatively bridging said manifold assembly and said clamping means for exerting a clamping force between said planar orifice plate and said planar mounting surface to thereby minimize bowing of said orifice plate along its longitudinal axis.

31. An orifice plate mounting assembly as in claim 30, wherein said clamping means includes a pair of clamping members each having a clamp body and a clamping arm extending substantially horizontally outwardly from said clamp body and defining a substantially planar contact surface, each said clamping member being operatively disposed on said manifold assembly and having hinge means for removably positioning each said clamping arm in planar contact with a respective portion of said planar orifice plate laterally of said linear array of orifices.

32. An apparatus for tensioning an orifice plate in a fluid jet printer of the type having a manifold assembly including an interior cavity having an elongated slot in fluid communication therewith and a substantially planar orifice plate mounting surface surrounding said elongated slot, said apparatus comprising:

a fixed member rigidly secured to one end of said orifice plate mounting surface;

a movable member operatively connected to said fixed member and coupled to one end of said orifice plate;

means for securing the other end of said orifice plate to said orifice plate mounting surface; and means for adjusting the position of said movable member relative to said fixed member to cause translational movement of said orifice plate in the direction of the longitudinal axis of said longitudinal slot and to thereby tension said orifice plate.

33. An apparatus as in claim 30 wherein said means for adjusting said movable member further comprises (a) actuator means for adjusting the position of said movable member;

(b) spring means operatively connected to said actuator means and being coupled at one end to said orifice plate for causing reciprocal translational movement of said orifice plate; and (c) cable means operably connecting said spring means and said actuator means.

* * * * *

UNITED STATES PATENT AND TRADEMARK OFFICE
CERTIFICATE OF CORRECTION

PATENT NO. : 4,725,851

DATED : February 16, 1988

INVENTOR(S) : Sutera et al

It is certified that error appears in the above-identified patent and that said Letters Patent is hereby corrected as shown below:

On the cover page, immediately before the "ABSTRACT", the phrase "Attorney, Agent or Fim - Nixon & Vanderhye" has been omitted.

Column 6, line 52, the word "of" should read --by--. Column 7, line 30, the word "witht" should read --with--; and line 45, the word "planr" should read --planar--.. Column 10, line 51, the word "supplY" should read --supply--. Column 11, line 21, the word "position" should read --positioning--; and line 31, the word --plate-- should appear between the words "orifice" and "to".

Signed and Sealed this

Sixth Day of September, 1988

*Attest:*

DONALD J. QUIGG

*Attesting Officer*

*Commissioner of Patents and Trademarks*